United States Patent [19]

Fritscher

[11] Patent Number: 5,080,981

[45] Date of Patent: Jan. 14, 1992

[54] NICKEL-CONTAINING ALLOYS AS AN ADHESIVE LAYER BONDING METAL SUBSTRATES TO CERAMICS

[75] Inventor: Klaus Fritscher, Cologne, Fed. Rep. of Germany

[73] Assignee: Deutsche Forschungsanstalt für Luft und Raumfahrt e.V., Cologne, Fed. Rep. of Germany

[21] Appl. No.: 545,991

[22] Filed: Jun. 28, 1990

Related U.S. Application Data

[63] Continuation of Ser. No. 266,399, Nov. 2, 1988, abandoned.

[30] Foreign Application Priority Data

Nov. 4, 1987 [DE] Fed. Rep. of Germany ....... 3737361

[51] Int. Cl.$^5$ ............................................. B32B 15/04
[52] U.S. Cl. .................... 428/633; 428/660; 428/680
[58] Field of Search .............. 428/621, 632, 633, 660, 428/680

[56] References Cited

U.S. PATENT DOCUMENTS

| | | | |
|---|---|---|---|
| 4,335,190 | 6/1982 | Bill et al. ............................. | 428/633 |
| 4,485,151 | 11/1984 | Stecura ................................ | 428/633 |
| 4,530,885 | 7/1985 | Restall ................................ | 428/680 |
| 4,535,033 | 8/1985 | Stecura ................................ | 428/633 |
| 4,909,984 | 3/1990 | Singheiser et al. ................. | 428/680 |
| 4,946,749 | 8/1990 | Restall et al. ....................... | 428/660 |

OTHER PUBLICATIONS

Stecura, S., *Ceramic Bulletin*, vol. 61, No. 2, 1982, pp. 256-262.
Maier, R. et al., *Ceramic Bulletin*, vol. 60, No. 5, 1981, pp. 555-560.

*Primary Examiner*—Melvyn J. Andrews
*Assistant Examiner*—George Wyszomierski
*Attorney, Agent, or Firm*—Fish & Richardson

[57] ABSTRACT

The invention relates to the use of alloys containing
  50 to 70% by weight of nickel,
  10 to 40% by weight of chromium,
  3 to 10% by weight of aluminum,
  4 to 10% by weight of titanium and
  1 to 3% by weight of silicon,
which alloys have a coefficient of thermal expansion $\alpha$ in the range of from 12 to $16 \times 10^{-6}$ K$^{-1}$ between 293 and 1370 K, as an adhesive layer bonding alloys based on nickel or titanium to a ceramic, and to processes for the preparation of said alloys.

2 Claims, 3 Drawing Sheets

NICKEL-CONTAINING ALLOYS AS AN ADHESIVE LAYER BONDING METAL SUBSTRATES TO CERAMICS

This is a continuation of Ser. No. 266,399, filed on Nov. 2, 1988.

The invention relates to the use of alloys which contain nickel as an essential component in addition to other metals as a material applied onto substrate alloys based on nickel or titanium, and to a process of preparing such special alloys.

It has been known for a long time that in high-performance internal combustion engines, for example for aircraft, the combustion process can be positively affected by insulating the individual combustion chambers from the surrounding materials by means of thermal barrier layers. Such thermal barrier layers conventionally consist of oxidic materials such as, for example, magnesium zirconate and/or zirconium oxide. In the range of the limits of performance the efficiency of the combustion process is clearly enhanced. Moreover, the coating of metallic materials with oxidic thermal barrier layers contributes to reduced tension stress in the thermally strained material.

Under this aspect problems were created again and again by the bonding between the respective oxidic thermal barrier layer and the metallic material. On the one hand, the problems were caused by that usually ceramics and other oxidic materials have coefficients of thermal expansion (CET) $\alpha$ different from those of metals or metal alloys. This disadvantage could be overcome by selecting suitable materials having comparable or equal coefficients of thermal expansion.

On the other hand, it was to be taken into consideration that ceramic materials are so-called "anion conductors" which conduct $O^{2-}$ ions and also release them to the adjacent metallic layer. This layer would be oxidized thereby. However, such an oxidation reaction is always associated with an increase in volume, and there was also the imminent danger of that the thermal barrier layer would be "disintegrated" from the metal surface.

It was attempted to solve the problems as above by providing an intermediate layer between the oxidic thermal barrier layer and the metallic substrate, said intermediate layer consisting of a metal or several alloyed metals and having been adapted with respect to its coefficient of thermal expansion to the substrate metal and the oxidic thermal barrier layer. Such intermediate layers comprised an important improvement over the direct connection of oxidic thermal barrier layers with metallic substrates by expansion gap segmenting and ensured an optimum balance between the coefficients of thermal expansion of the two metallic layers. However, the desired stability to diffusion was not realized thereby. Components of the intermediate layer alloys diffused into the substrate metal layer and thereby changed the properties thereof in an undesired manner. This caused the metallic material to become porous which was not acceptable for practical purposes. Such systems consisting of a metallic substrate, a metallic intermediate layer and an oxidic layer applied by plasma spraying are described, for example, in "Ceramic Bulletin" 60, 555 (1981) and loc. cit. 61, 256 (1982).

However, with the thermal barrier layers described in prior art it has so far not been possible to meet the requirement of the coefficients of thermal expansion of the metallic substrate and of the thermal barrier layer having been adapted to each other as well as to ensure that the thermal barrier layers protect the metallic substrate from a penetration of noxious alien matter, which latter is understood to mean anions from the environment and the hot waste gas and the oxidic ceramic layer, respectively, as well as metals from the intermediate layer. Due to the requirements of engineering to make available materials which are capable of withstanding higher duty and have an extended use life, there rather was a strong demand for providing metallic substrates with improved thermal barrier layers and thereby to render them applicable to broader use. In addition to the requirement to improve the oxidic layer as immediately exposed to the action of hot gases, another focal point of development was seen in improving the intermediate layer in such a manner that not only its coefficient of thermal expansion conforms to that of the metallic substrate as well as that of the oxide layer, but also it provides a sufficient diffusion stability and itself is of such a quality that no components of the intermediate layer alloy will diffuse into the metallic substrate and thereby change the properties thereof in an undesirable manner.

Surprisingly, said condition was met by that materials were developed which are neither pervious to undesired ions of the ceramic layer nor will release alloy components to the metal substrate nor on thermal strain tend to a fatigue of the metal-to-ceramic bond. In an advantageous manner said materials can be used for bonding ceramic anion conductors to alloys based on nickel or titanium as well as a hot corrosion resistant layer on alloys based on said metals.

The invention relates to the use of alloys containing
50 to 70% by weight of nickel,
10 to 40% by weight of chromium,
3 to 10% by weight of aluminum,
4 to 10% by weight of titanium and
1 to 3% by weight of silicon,
which alloys have a coefficient of thermal expansion $\alpha$ in the range of from 12 to $16 \times 10^{-6} K^{-1}$ between 293 and 1370 K, as a material on alloys based on nickel or titanium.

According to a preferred embodiment of the present invention, said material is used for bonding ceramic anion conductors to nickel-based alloys or titanium-based alloys, and more specifically as adhesion layer for ceramic protective layers serving as thermal barrier layers on metallic substrates or cermets.

According to a preferred embodiment of the present invention, said material is used as hot corrosion resistant layer.

The invention also relates to a process for preparing alloys comprising
50 to 70% by weight of nickel, and preferably 52 to 66% by weight of nickel,
10 to 40% by weight of chromium, and preferably 17 to 38% by weight of chromium,
3 to 10% by weight of aluminum,
4 to 10% by weight of titanium and
1 to 3% by weight of silicon, and preferably 2 to 2.5% by weight of silicon,
characterized in that
(a) nickel, chromium, aluminum, titanium and silicon are mixed in a finely divided form and optionally alloyed,
(b) a metal substrate or, if desired, a cermet substrate is prepared for the application of an alloy, (c) the physical blend of the finely distributed alloy components or the alloy are applied at an elevated temperature in the form of an alloyed layer onto the metal substrate or, if desired, a cermet substrate, (d) the alloy is mechanically compacted and/or flattened and (e) the alloy-coated metal substrate or optionally cermet substrate is subjected to a temperature treatment in the absence of oxygen.

According to the present invention, metallic materials are preferred to be used as substrates, as they have proven to be useful in the areas of high-performance technology as under consideration. However, cermets may also be used as materials, as will be described hereinbelow. Cermets are understood to be materials comprising a physical blend of metallic and ceramic components synthesized by, e.g., hot pressing to give a composite material having new properties.

The alloys used as materials according to the invention—like thermal barrier coatings known from prior art—contain nickel as major component. Further metals, also basically used for intermediate layers already known of thermal barrier layers, are chromium and aluminum. However, the present alloys are distinguished from prior art alloys for said purpose by their titanium and silicon contents.

If so desired, the alloys used as materials according to the invention may contain still other conventional alloy components in addition to the five metals mentioned. These components may be, for example, hafnium, tantalum, tungsten and/or rare earth metals such as yttrium, cerium and samarium as metallic elements.

Alloys containing nickel as major component which are used as materials according to the invention have a coefficient of thermal expansion $\alpha$ in the range of from 12 to $16 \times 10^{-6}$ $K^{-1}$ between 293 and 1370 K. The advantage of a coefficient of expansion within said range is to be seen in that such alloys may be optimally adjusted to the coefficients of thermal expansions of the metallic substrates as well as to those of the oxide ceramics of the thermal barrier layers and thereby no tension stresses are caused to occur within the pieces of coated material upon temperature action or temperature changes.

Alloys according to the invention which are used as materials contain from 50 to 70% by weight of nickel, from 10 to 40% by weight of chromium, from 3 to 10% by weight of aluminum, from 4 to 10% by weight of titanium and from 1 to 3% by weight of silicon. The further potential alloy components as indicated above may be present in such alloys in amounts of from 0.1 to 2% by weight. In preferred alloys used as materials in accordance with the invention such components are hafnium, tantalum, tungsten and/or rare earth metals such as yttrium, cerium and samarium.

Preferred alloys used according to the invention as materials contain nickel in an amount of from 52 to 66% by weight, chromium in an amount of from 17 to 38% by weight, aluminum in an amount of from 3 to 6% by weight, titanium in an amount of from 4 to 10% by weight and silicon in an amount of from 2 to 2.5% by weight, here as well as in the following all percentages being based to the total weight of the alloy. It is preferred that the alloys used as materials according to the invention have a coefficient of thermal expansion $\alpha$ in the range of from 13 to $15 \times 10^{-6} K^{-1}$ between 293 and 1370 K. Thus, they have been adjusted in an optimal manner to the coefficients of expansion of the adjacent substrates and oxide ceramic layers, respectively.

The new alloys according to the invention which contain nickel as major component and are used as materials are produced and simultaneously applied onto the metal substrates by a process the individual steps in the multiplicity thereof are per se known from prior art. The preparation route is characterized in that in a first step the employed metallic constituents are blended in a finely divided form. Thus, finely divided powders of the metals nickel, chromium, aluminum, titanium, silicon and optionally still further alloy components are mixed with each other in conventional powder mixers to ensure the production of a physical blend in powder form having a constant composition of the alloy components-to-be. Such blends comprising the individual metallic components may be employed as such. With advantage they may be converted into a so-called "mechanically alloyed powder form" by subsequent grinding in a ball mill. The appropriate method is per se known from prior art. However, according to the present process it is also possible to alloy the physical blend by temperature increase in a per se conventional manner, i.e. by melt-metallurgical route, thereby to prepare it for the subsequent process step.

Thereafter in a further process step the metal substrate which the alloy is to be applied onto may be prepared, if desired, for said application. This step is not compulsorily required while, however, it may be advantageous in particular embodiments of the process to further improve the adhesion of the alloy on the metal substrate beyond the usually already high level. Such a pre-treatment may consist, for example, of that the surface of the metal substrate is sand-blasted and thereby roughened so that the alloy layer subsequently applied thereunto will adhere even better to the metallic substrate.

In a subsequent process step either the physical blend obtained in the first step of the finely divided well distributed alloy components or the alloy already formed thereafter is applied onto the metal substrate in the form of an alloyed layer at elevated temperature. In this procedure, depending on the kind of process, temperatures within the range of from room temperature (293 K) to 1300 K will have to be maintained. The temperature actually to be employed will depend not only on the kind of process, but also on the conditions otherwise employed such as pressure etc.

The application of the physical blend or alloy, respectively, of the components in the form of an alloy layer onto the metal substrate may be effected, for example, by vapor deposition. The vapor deposition of metallic layers on metallic substrates has been known in detail from prior art. Hereto, reference is made, for example, to the above-mentioned printed papers published in "Ceramic Bulletin." For the evaporation of the metal composition or metal alloy generally pressures within the range of from $10^{-6}$ to $10^{-8}$ bar are employed. In response to the amount and the ratio of the individual alloy components to each other, under the process conditions to be applied there are formed metal vapors which are deposited on the cooler metal substrate surface. The rate of deposition, i.e. the rate of formation of the alloyed layer according to the invention, is within the range of from 5 to 20 $\mu$m/min.

It corresponds to a further also preferred embodiment of the present process to apply fine powders of the alloys in a per se known manner onto the metal substrate by plasma-spraying. This may be effected at low pressure (low pressure plasma spraying, LPPS) or at atmospheric pressure (atmospheric pressure plasma spraying, APS). Devices known from prior art are used for this purpose. The temperatures employed are from 573 to 1073 K (300° C. to 800° C.).

In a further also preferred embodiment of the present process, the fine alloy powders are applied onto the metal substrate by way of detonation coating. This is done under conditions known in the art for this method.

A further advantageous embodiment of the process according to the invention consists of alloying the physical blend of the finely divided alloy components—as described above—and, for example, to manufacture thin metal foils from the alloy thus obtained. These have a thickness of from 50 to 200 $\mu m$. Such an alloy foil may then be advantageously applied onto the metal substrate by diffusion welding. In the course thereof temperatures within the range of from 1273 to 1523 K (1000° to 1250° C.) and pressures within the range of from 20 to 500 MPa are employed. In the course thereof a bonded composite is formed between metallic substrate and alloy according to the invention the strength of which bonded composite exceeds that of conventional substrate-layer bonds.

In addition to the processes mentioned above, for the application of the physical blend of the finely distributed alloy components or of the components already alloyed in a finely divided state any other process known in the art of applying metallic components onto a metallic substrate is usable and included in the present invention. As an example therefore, there may be mentioned the application by flame spraying or explosion plating.

In a subsequent process step the alloyed layer as applied on the metal substrate is mechanically compacted and/or flattened. For this purpose there may also be employed the procedures of compacting and/or flattening as conventional in prior art. Thus, for example, it is possible to compact and flatten the alloyed layer by glass bead blasting. Thereupon, metallic alloy layers having a thickness of from 10 $\mu m$ to 50 $\mu m$ and high density are obtained, which depends on the composition of the alloy layers in detail and effectively protects the metallic substrate from a diffusion thereinto of undesired alien ions of the ceramic thermal barrier layer.

The last step of the process according to the invention consists of that the alloy-coated metal substrate is subjected to a temperature treatment in the absence of oxygen. Therein, the substrate-alloy composite preferably is subjected to a temperature in the range of from 1273 to 1363 K (1000° to 1090° C.). In order to prevent an oxidation of the alloy layer at these temperatures, it is required that the temperature treatment is carried out in the absence of oxygen. Measures necessary thereto are known in the art and may consist, for example, of carrying out the temperature treatment in vacuo. In preferred embodiments of the process the temperature treatment is carried out at a pressure of from $10^{-1}$ to $10^{-4}$ mbar over a period of from 1 to 5 hours. By means of this temperature treatment, the exact duration of which depends on the selected temperature and on the composition of the alloy, a diffusion zone is allowed to be formed between substrate and alloy layer which still improves the good adhesion between the two alloys.

The metal substrate-alloy composite obtained via the above-described route has been conditioned thereby for being coated with the ceramics. By process steps which have been known from prior art and are not subject matter of the present invention, the desired ceramics are applied onto the alloy intermediate layer using optional methods. These include plasma spraying, flame spraying, vapor deposition or the use of a detonation gun. The oxidic ceramics which to an optimum degree have proven their value are preferably zirconium oxide ceramics partially stabilized with yttrium. However, any other ceramics known from prior art which may serve as thermal barrier layers, i.e. have a low heat conductivity, may also be used. The ceramic layers applied by means of the known methods are subsequently subjected to a glow treatment. This glow treatment serves to improve the stability to oxidation rather than to release tensions. This is attained by the formation of a high temperature oxide phase at the phase boundary surface metal/ceramics. For this reason the glow treatment is carried out in an oxidizing atmosphere, preferably at 1273 to 1373 K (1000° to 1100° C.) for 0.5 to 5 hours, the exact duration of the treatment depending also on the temperature. In said treatment gases or gas mixtures comprising larger or lesser amounts of oxidizing components can be employed. These include air, mixtures of $H_2$ and $H_2O$, of CO and $CO_2$, of air with one or more than one of said gases or gas mixtures and also air/oxygen mixtures. The rates employed of said gases are chosen with view to how the optimum high temperature oxide phase is to be formed. Such indications are readily apparent to the artisan from prior art.

The alloys to be used according to the invention as materials and producible according to the process described above may be used, under one aspect, as an intermediate layer for multi-layer thermal barrier layers. They are preferred to be used as adhesive layers for ceramic protective layers. In the temperature range as important for practical use, the coefficients of thermal expansion $\alpha$ fit the coefficients of thermal expansion of the metallic substrates as well as the coefficients of thermal expansion of oxidic ceramic layers. The coefficients of thermal expansion within the same range cause the optimum bond between metallic substrate and oxidic thermal barrier layer to be retained so that no cracks, due to different coefficients of expansion, will arise which definitely would adversely affect the function of the thermal barrier layers and, moreover, would allow the access of undesirable matter, for example of corrosive substances or materials changing the layer structure. In addition, the alloys and, hence, the intermediate layers composed thereof, prevent undesired materials from penetrating into the metallic substrate of the alloys based on nickel and the alloys based on titanium. The stability to diffusion of the alloys according to the invention clearly excels that of the conventional intermediate layers.

Under a second aspect, the alloys used according to the invention as materials are advantageously employed as hot corrosion resistant layer on metal substrates such as, for example alloys based on nickel or alloys based on titanium.

It is also considered to be within the scope of the invention to apply the alloys according to the invention onto "cermets" as substrates. In the ranges here of interest said cermets have properties similar to those of metallic substrates. The alloys to be used as materials according to the invention which may be applied onto substrates by means of the described processes exhibit the advantages as featured above also in the case that they are alloyed onto cermets: Their coefficients of expansion do optimally fit to those of the adjacent cermet layers or ceramic layers, respectively. Moreover, they protect the substrate layer from a penetration of undesired ions changing the layer structure.

The invention is further illustrated by the following examples.

EXAMPLE 1

Physical blends were prepared which comprise the metals and amounts thereof as specified in the following Table 1. The metal powders had particle diameters within the range of from 50 to 500 μm.

The values set forth in Table 1 for the alloy constituent Al are minimum values; they may be increased (at the expense of the other components) by up to 5% by weight to a maximum of 10% by weight.

TABLE 1

| Composition of the alloy used as material according to the invention (% by weight) | | | | | |
|---|---|---|---|---|---|
| Ex. | Ni | Cr | Al | Ti | Si |
| 1a | 67.2 | 16.8 | 5.0 | 8.9 | 2.1 |
| 1b | 60.2 | 27.2 | 3.7 | 6.8 | 2.1 |
| 1c | 52.8 | 37.2 | 3.3 | 4.6 | 2.1 |

The amounts indicated in Table 1 of each of the powdered metals were blended with each other. Then said mixtures were melted in a corundum crucible in vacuo ($10^{-5}$ mbar) and cast to form rods. Therefrom cylindrical test specimens were prepared which were used to determine the oxidation behavior and to produce composites comprising an alloyed substrate and an alloyed diffusion layer (cf. the above observations relating to diffusion welding).

EXAMPLE 2

The alloys obtained according to Example 1, melted from the finely divided alloy components, were once more subjected to a melting process and subsequent solidification process starting from the bottom of the corundum crucible at a temperature gradient of about 50 K/cm and a rate of solidification of about 20 cm/h in vacuo to obtain pipe-free rods of the alloys having a low gas content for the subsequent evaporation. Then these alloys were vapor-deposited at a pressure of $5 \times 10^{-5}$ mbar on a metal substrate having a substrate temperature of 1173 K (900° C.) and the composition as follows:

61.5% by weight of Ni,
32.3% by weight of Mo,
6.2% by weight of Al.

Said substrate alloy had an average coefficient of thermal expansion α of $13.3 \times 10^{-6} K^{-1}$ between 293 K (room temperature) and 1273 K.

The substrate alloy composite obtained by vapor deposition was compacted and flattened in its surface region by glass bead blasting and then further treated at a pressure of $10^{-5}$ mbar and a temperature of 1353 K (1080° C.) for 4 hours. Thereupon the metallic substrate had been provided with homogeneous intermediate layers of about 80 μm in thickness.

Figure 1:
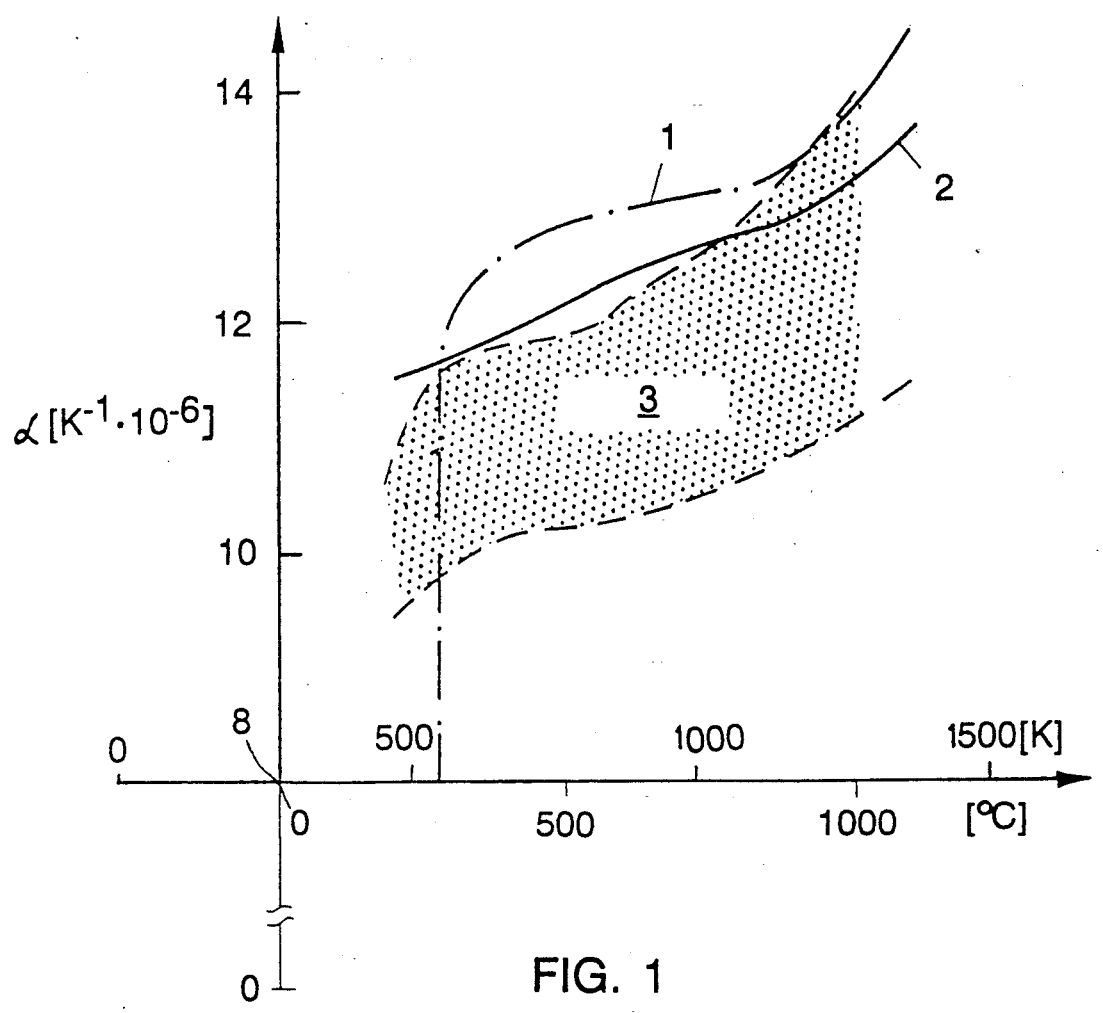
FIG. 1 shows the temperature dependance of the coefficients of thermal expansion of individual layers of a composite article according to the invention.

Onto these intermediate layers there was applied a layer of zirconium oxide stabilized with 7.2% by weight of $Y_2O_3$ by low pressure plasma spraying (LSPP) at an argon pressure of 40 mbar. FIG. 1 shows the temperature dependance of the coefficients of thermal expansion of the individual layers in comparison to one another of the composite containing the alloy according to Example 1a. Curve (1) in FIG. 1a represents the coefficient of thermal expansion of the alloy of Example 1a; curve (2) represents the coefficient of thermal expansion of a plasma-sprayed zirconium oxide partially stabilized with 7.2% by weight of $Y_2O_3$ (data according to P. Boch et al., Advances in Ceramics, Vol. 12, Science and Technology of Zirconia II, N. Claussen et al. (ed.), Am. Ceram. Soc. Inc., 1984, pp. 488–502); and area (3) represents the coefficient of anisotropic thermal expansion of a eutectic alloy comprising 61.5% by weight of nickel, 32.3% by weight of molybdenum and 6.2% by weight of aluminum, said alloy having been solidified in an orientation state.

Figure 2:
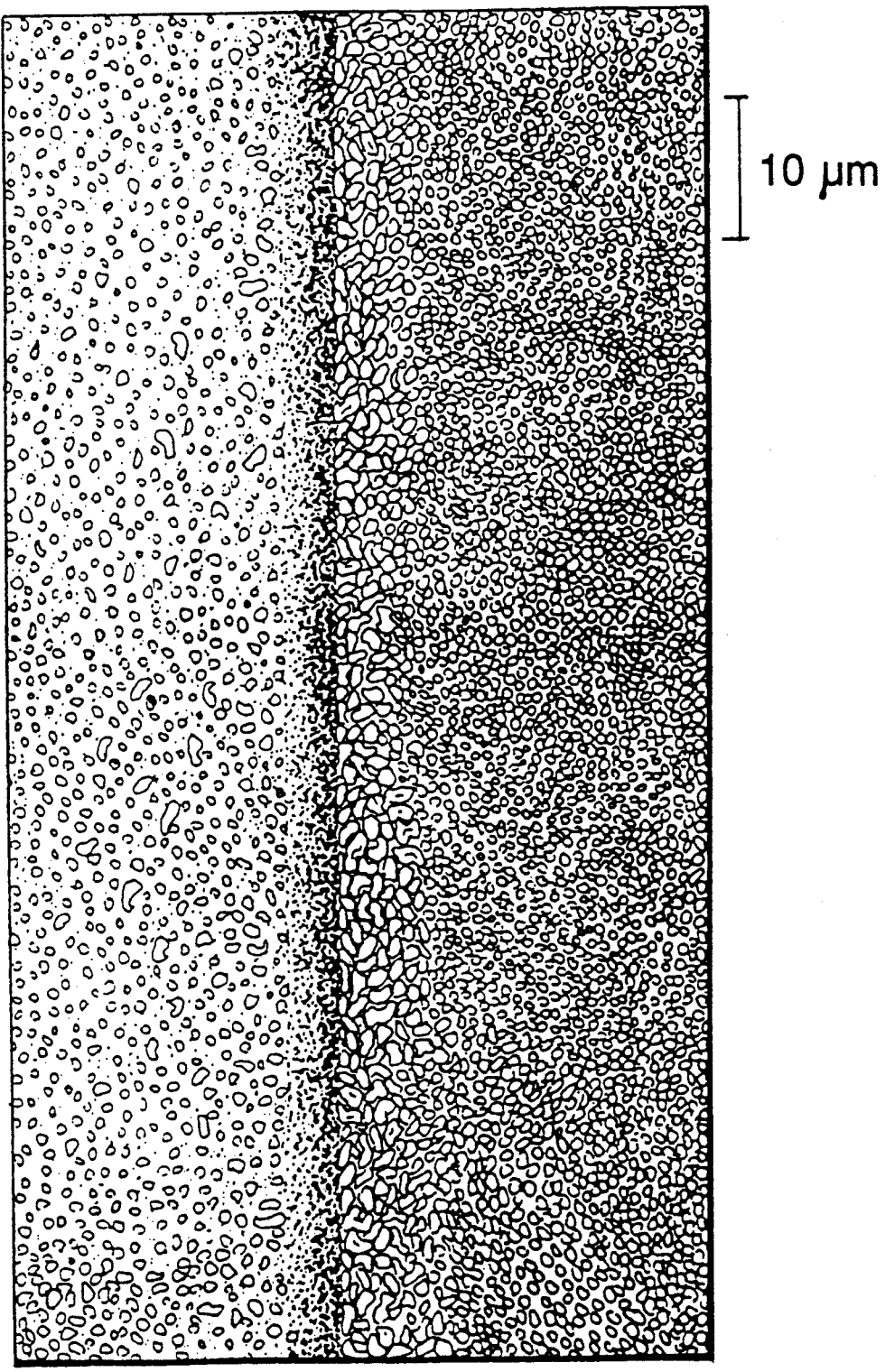
FIG. 2 is a micrograph of a cross-sectional view of a metallic substrate and alloy layer of a composite article.

The produced metal substrates provided with a two-layered thermal barrier layer were subjected to an optical investigation. The low extent of interdiffusion between the alloy layer according to the invention and the nickel alloy of the metallic substrate is apparent from FIG. 2, which shows a micrograph in cross section of a double layer structure comprising a eutectic alloy (layer shown on the right side) containing 61.5% by weight of nickel, 32.3% by weight of molybdenum and 6.2% by weight of aluminum, said alloy having been solidified in an orientated state, and an alloy layer according to the invention (Example 1a) vapor-deposited thereon (layer shown on the left side). The composite obtained thereby was subsequently heat-cycled for 100 hours in a hot corrosion burner rig. One cycle consisted of maintaining the composite comprising substrate and alloy according to the invention at 1173 K (900° C.) for 57 minutes and then cooling said composite with pressurized air to room temperature (293 K) for 3 minutes. From FIG. 2 it will be clearly apparent that only a minimal interdiffusion layer has been formed the thickness of which is significantly less than 10 μm.

Figure 3:
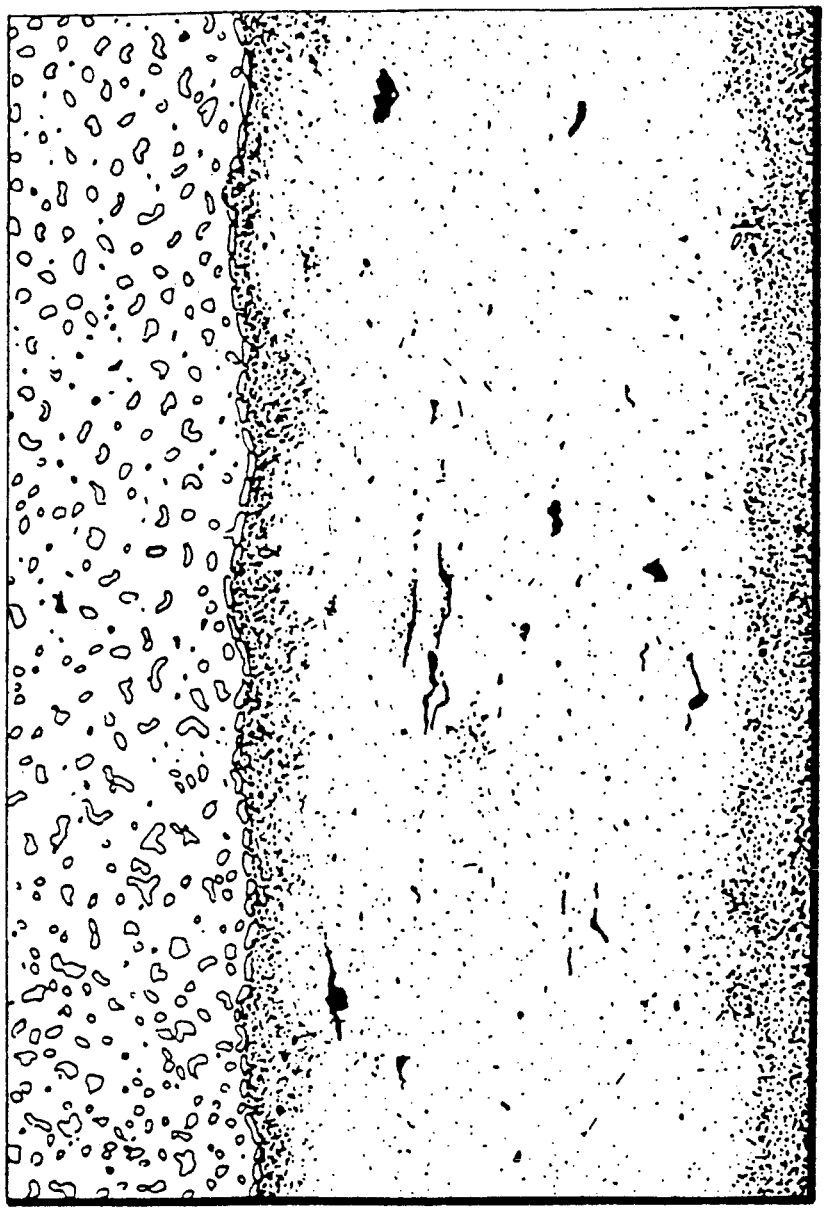
FIG. 3 is a micrograph of a cross-sectional view of an alloy layer and a ceramic layer of a composite article.

The oxidation rates upon tests of isothermal annealing in air at 1173 and 1273 K (900° C. and 1000° C.) and cycle annealing between 873 and 1373 K (600° C. and 1100° C.) in cycles of 40 minutes were below 0.5 mg/cm². 100 h. The adhesion and interdiffusion between the plasma-sprayed ceramics and the intermediate layer consisting of the alloy used according to the invention as material for an intermediate layer of a thermal barrier layer is apparent from FIG. 3, which shows a micrograph in cross section of a composite comprising a zirconium oxide (stabilized with 7.2% by weight of $Y_2O_3$) (right side) and an alloy according to the invention (Example 1a). Said Composite had been subjected to 1000 cycles (10 minutes each) of heating at 1373 K (1100° C.) and cooling to room temperature. From FIG. 3 it is clearly evident than only minor chemical reactions took place between the two layers of the composite, which include the diffusion of components of the ceramic layer into the adjacent alloy layer. A good adhesion of the two materials to each other is also demonstrated: no stress cracking is observed in the ceramic layer.

EXAMPLE 3

A rectangular parallelepiped (cuboid) of 8 mm ×15 mm ×15 mm in size was cut from an alloy obtained according to Example 1a, which had been subjected to another melting process and solidification process according to Example 2. One surface of this cuboid was ground until smooth, cleaned in vacuo using a hydrogen glow discharge plasma, and then coated with a platinum layer of about 0.5 μm in thickness by the sputtering technique to avoid a substantial gas adsorption. A cuboid of about the same dimensions was prepared from a titanium alloy (84.89 Ti - 6.00 Al - 4.00 Sn - 3.50 Zr - 0.70 Nb - 0.50 Mo - 0.35 Si - 0.06 C in % by weight) and ground, glow discharge-cleaned and platinum-coated as described above.

For preparing a composite, the platinum-coated surfaces of the two cuboids were placed on each other and, in order to effect diffusion welding, the assembly was annealed under vacuum at a contact pressure of 20 MPa (cf. the above observations relating to diffusion welding) at 1223 K (950° C.) for 4 hours. A cross-sectional micrograph was taken of the obtained composite to evaluate the bonding zone of the composite. The interdiffusion zone was rated to be tight and had a thickness of only 8 μm. These results justify the use of the alloy used according to the invention as a material for protecting not only nickel-based alloys, but also titanium-based alloys, from oxidation and hot corrosion.

I claim:

1. A corrosion resistant composite article having a nickel or titanium-containing substrate layer bonded to a ceramic protective layer by means of an alloy adhesive layer, said alloy adhesive layer comprising
    50 to 70% by weight of nickel,
    10 to 40% by weight of chromium,
    3 to 10% by weight of aluminum,
    4 to 10% by weight of titanium, and
    1 to 3% by weight of silicon,
    wherein each of said substrate layer, said ceramic protective layer, and said alloy adhesive layer has the same coefficient of thermal expansion $\alpha$, and wherein $\alpha$ is in the range of from 12 to $16 \times 10^{-6}$ $K^{-1}$ between 293 and 1370 K.

2. A composite article as claimed in claim 1, characterized in that said alloy adhesive layer comprises
    52 to 66% by weight of nickel,
    17 to 38% by weight of chromium,
    3 to 6% by weight of aluminum,
    4 to 10% by weight of titanium, and
    2 to 2.5% by weight of silicon.

* * * * *